(12) United States Patent
Cordeiro et al.

(10) Patent No.: US 8,155,141 B2
(45) Date of Patent: Apr. 10, 2012

(54) SYSTEM, APPARATUS, AND METHOD FOR A TWO-STAGE MECHANISM FOR QUIET PERIOD MANAGEMENT IN SPECTRUM AGILE RADIO NETWORKS

(75) Inventors: Carlos M. Cordeiro, Ossining, NY (US); Kiran S. Challapali, New City, NY (US); Dagnachew Birru, Yorktown Heights, NY (US)

(73) Assignee: Koniklijke Philips Electronics N.V., Eindhoven (NL)

( * ) Notice: Subject to any disclaimer, the term of this patent is extended or adjusted under 35 U.S.C. 154(b) by 876 days.

(21) Appl. No.: 12/280,000

(22) PCT Filed: Feb. 20, 2007

(86) PCT No.: PCT/IB2007/050545
§ 371 (c)(1),
(2), (4) Date: Aug. 20, 2008

(87) PCT Pub. No.: WO2007/096819
PCT Pub. Date: Aug. 30, 2007

(65) Prior Publication Data
US 2010/0061315 A1   Mar. 11, 2010

Related U.S. Application Data

(60) Provisional application No. 60/775,590, filed on Feb. 22, 2006, provisional application No. 60/862,234, filed on Oct. 20, 2006.

(51) Int. Cl.
*H04L 12/43* (2006.01)
*H04J 3/16* (2006.01)

(52) U.S. Cl. ........................................ 370/458; 370/465
(58) Field of Classification Search ..................... None
See application file for complete search history.

(56) References Cited

U.S. PATENT DOCUMENTS

| | | | |
|---|---|---|---|
| 2004/0057507 A1* | 3/2004 | Rotstein et al. | 375/219 |
| 2004/0132411 A1* | 7/2004 | Li | 455/67.13 |
| 2004/0166846 A1* | 8/2004 | Backes et al. | 455/434 |
| 2005/0009565 A1* | 1/2005 | Kwak | 455/561 |
| 2005/0122261 A1* | 6/2005 | Kim | 342/357.15 |
| 2006/0009228 A1* | 1/2006 | Kang et al. | 455/450 |
| 2006/0214837 A1* | 9/2006 | Liu et al. | 342/52 |
| 2007/0104176 A1* | 5/2007 | Ji et al. | 370/348 |
| 2007/0147410 A1* | 6/2007 | Kumar | 370/431 |
| 2009/0219909 A1* | 9/2009 | Ko et al. | 370/343 |
| 2009/0252048 A1* | 10/2009 | Liang et al. | 370/252 |
| 2010/0267414 A1* | 10/2010 | Backes et al. | 455/522 |

OTHER PUBLICATIONS

IEEE 802.22-05/0094r0, Nov. 2005, slide 19 and 21.*

(Continued)

*Primary Examiner* — Hassan Phillips
*Assistant Examiner* — Eunsook Choi
(74) *Attorney, Agent, or Firm* — Larry Liberchuk (57) ABSTRACT

The present invention is a system (1200), base station (1100)/customer premise equipment (1150) apparatus, and method (400 450) for a two-stage quiet-period management mechanism that provides the required protection to incumbents (primary spectrum users) while supporting the desired QoS of secondary users participating in a cognitive radio network. In the first stage, a simple fast sensing (301) is done (e.g., energy detection) by all devices in the network. Depending on the result of the fast sensing, the second and possibly longer stage, herein termed fine sensing (302), is performed.

41 Claims, 11 Drawing Sheets

OTHER PUBLICATIONS

M. Bellec et al., "A PHY/MAC Proposal for IEEE 802.22 WRAN Systems, Part 1, The PHY" IEEE 802.22-05/0004RO, Jan. 11, 2006, pp. 1-34, XP007902868 www.ieee802.org/22/Meeting_documents/2006_Jan/22-06-004-0000_ETRI-FT-Philips-Samsung_PHY_Spec.doc.

W. Hu et al., "IEEE 802.22 Wireless RAN Standard PHY and MAC Proposal", Jan. 9, 2006, pp. 1-61, XP007902891 www.ieee802.org/22/Meeting_documents/2006_Jan/22/05-0098-01-0000-_STM-Runcom_PHY-MAC_Outline.doc.

M. Bellec et al., "A PHY/MAC Proposal for IEEE 802.22 WRAN Systems", Jan. 17, 2006, pp. 1-222, XP07902888 www.ieee802.org/22/Meeting_documents/2006_Jan/22-06-0005-01-0000_ETRI-FT-Philips-Samsung_Proposal.ppt.

IEEE: "IEEE 802.11h: Amendment 5: Spectrum and Transmit Power Management Extensions in the 5 GHz Band in Europe", IEEE STD 802.11h, Oct. 14, 2003, XP002292634.

S. Choi et al., "Transmitter Power Control (TPC) and Dynamic Frequency Selection (DFS) Joint Proposal for 802.11h WLAN", Mar. 12, 2001, pp. 1-16, XP002213548.

"Clustering: Physical Cluster (cont.)", Jan. 2006, IEEE 802.22-06/0005r1.

"Local Detection at each CPE", Jan. 2006, IEEE 802.22-06/0005r1.

* cited by examiner

| NAME | ELEMENT ID (1 BYTE) | LENGTH (BYTES) | VALUE |
|---|---|---|---|
| RTG | 5 | 1 | RTG IN SLOTS |
| SENSING RTG | 17 | 1 | IF SET TO 1, THE CPE SHALL PERFORM FAST SENSING (I.E., ENERGY DETECTION) DURING RTG. |
| CHANNEL NUMBER FOR SENSING RTG | 18 | 1 | THE CHANNEL NUMBER THAT IS TO BE SENSED DURING THE SENSING RTG. |

FIG. 7

| SYNTAX | SIZE | NOTES |
|---|---|---|
| START FRAME | 8 BITS | FRAME NUMBER IN WHICH THE CHANNEL MEASUREMENT STARTED |
| DURATION | 16 BITS | THE ACTUAL DURATION OF THE MEASUREMENT |
| STARTING CHANNEL NUMBER | 8 BITS | |
| NUMBER OF CHANNELS | 8 BITS | |
| CHANNEL STATE FOR 'NUMBER OF CHANNELS' | 3 BITS | SEE FIG. 9 |
| ... | | |
| PADDING NIBBLE | | |

FIG. 8

| VALUE | STATE |
|---|---|
| 000 | UNMEASURED |
| 001 | VACANT |
| 010 | OCCUPIED |
| 011 | OCCUPIED BY PRIMARY USER |
| 100 | OCCUPIED BY TV SERVICE |
| 101 | OCCUPIED BY PART 74 SERVICE |
| 110 | OCCUPIED BY 802.secondary USER |
| 111 | RESERVED |

FIG. 9

| SYNTAX | SIZE | NOTES |
|---|---|---|
| MANAGEMENT MESSAGE TYPE | 8 BITS | |
| TRANSACTION ID | 16 BITS | |
| STARTING CHANNEL NUMBER | 8 BITS | |
| NUMBER OF CHANNELS | 8 BITS | |
| CHANNEL STATE FOR 'NUMBER OF CHANNELS' | 3 BITS | SEE FIG. 9 |
| ... | | |
| PADDING NIBBLE | | |

SYSTEM, APPARATUS, AND METHOD FOR A TWO-STAGE MECHANISM FOR QUIET PERIOD MANAGEMENT IN SPECTRUM AGILE RADIO NETWORKS

This application claims priority to U.S. Provisional application No. 60/775,590, filed on Feb. 22, 2006 and U.S. Provisional application No. 60/862,234 filed on Oct. 20, 2006.

The present invention relates to a system, apparatus and method for two-stage management of quiet periods in spectrum agile radio networks.

Spectrum management policy is currently evolving. For example, the US government has recently established a so-called spectrum policy initiative with a mandate to issue recommendations on how to better manage the spectrum. This has led the industry to investigate innovative approaches for opening the radio spectrum by allowing opportunistic usage of licensed but unused radio resources (hereby referred to spectrum opportunity or simply opportunity). This novel way of identifying and using spectrum opportunities is enabled by Spectrum Agile Radios (SARA), also known as Cognitive Radios, which enable the reuse of vacant spectrum without causing harmful interference to incumbents (e.g., TV signals), also known as primary users. This is not to say, however, that SARA can only be applicable to licensed spectrum. We envision scenarios where unlicensed frequency bands will also be populated with SARA devices.

Figure 1:
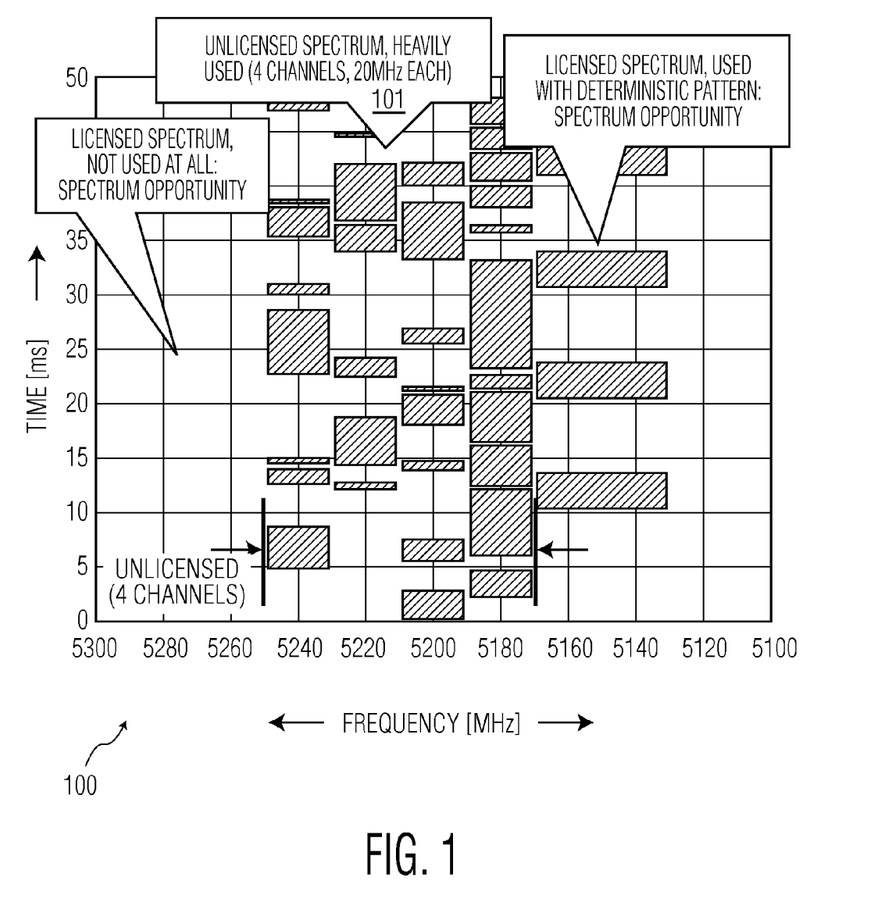
FIG. 1 illustrates a pattern of spectrum usage in four 802.11a channels operating in the 5 GHz U-NII frequency band. Grey portions represent busy frequency channels.

A major roadblock in the deployment of secondary users (e.g., SARA devices) in frequency bands already occupied by primary radio systems (either licensed or unlicensed) is that these primary radio systems may appear on a channel at unpredictable times 101, as depicted in FIG. 1. Therefore, to provide proper protection of primary users, secondary SARA systems very often rely on network-wide quiet periods. During these quiet periods, all network traffic is suspended and stations sense the channel on the lookout for primary users. Depending on the algorithm used for these quiet periods, they may be quite long (e.g., in the order of between tens and hundreds of milliseconds).

Paradoxically, users of the SARA network expect the same type of QoS available in existing wireless networks, including support of voice and video traffic. However, since these services demand stringent QoS requirements (e.g., could be 20 ms for voice), an obvious question is: how can a SARA system protect incumbents through quieting channels while, at the same time, support the QoS required by users of the SARA system?

Thus, there is a need in the art for a mechanism that efficiently addresses this problem of protecting incumbents while at the same time providing QoS level of service to users of a SARA system. The system, apparatus and method of the present invention provide such a mechanism that is based on a two-stage approach: fast sensing followed by optional fine sensing. The fast sensing is done before the fine sensing, and typically uses a quick and simple detection algorithm such as energy detection. It is done primarily over in-band channel(s), and the outcome of these measurements determines the need for the fine sensing. In addition, the results of the fast sensing also have an impact on the length of the fine sensing.

The present invention can be readily understood by one skilled in the art in view of the following detailed description with reference to the accompany drawings presented for only illustrative purposes. In the drawings, the same reference symbol denotes identical components in order to eliminate redundant description thereof.

Figure 2:
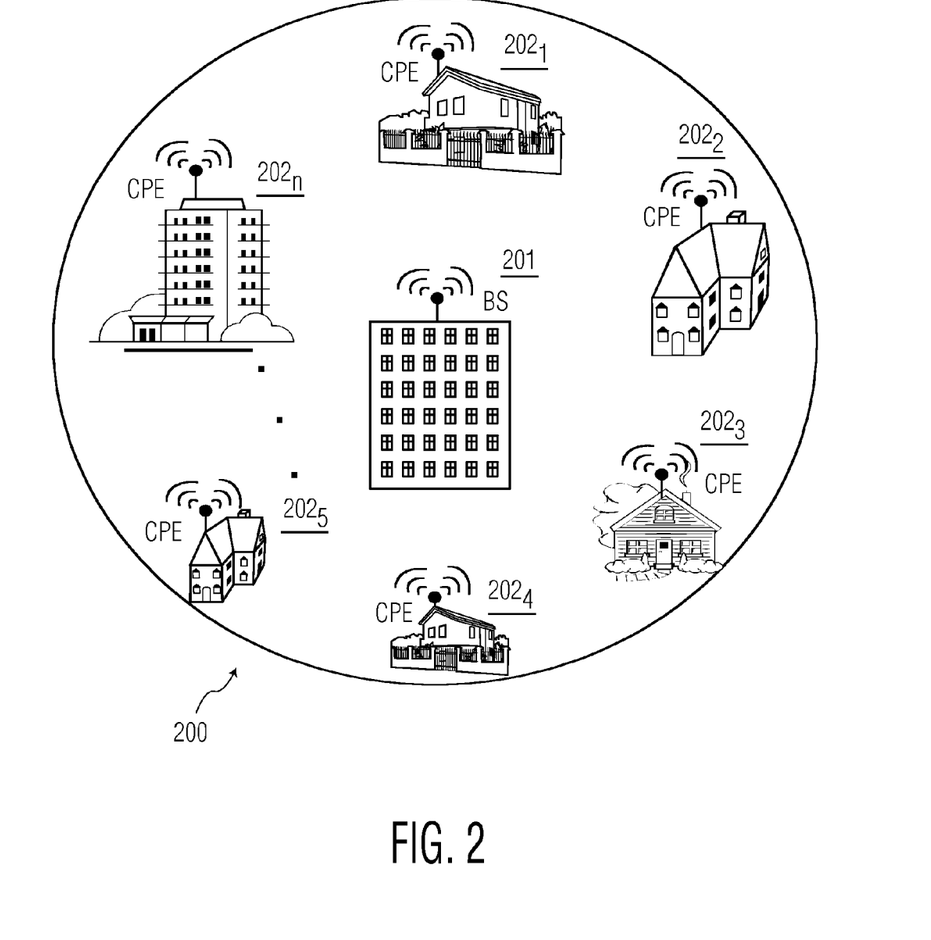
FIG. 2 illustrates an example of a centrally controlled wireless network comprised of one base station (BS) and a plurality of customer premise equipment (CPEs)

The present invention is described herein in the context of an infrastructure-based and centralized wireless system 200, which is characterized by a BS (Base Station) 201 and a number of CPE, either fixed or mobile, (Customer Premises Equipment) $202_i$ as illustrated in FIG. 2. In this type of system, the BS 201 regulates the medium access both downstream and upstream, which is done through MAC layer functions. In an alternative embodiment, the invention can also be used in distributed access systems.

This type of secondary system operates on an opportunistic spectrum access basis, wherein BSs $201_j$ and CPEs $202_i$ monitor the radio spectrum on the lookout for spectrum "holes". However, whenever a primary user reclaims a channel in use by a secondary SARA system, the secondary network has to be able to detect the presence of the primary system in a timely fashion. In addition, this has to be done while supporting the QoS expected by users of the secondary radio system.

Figure 3:
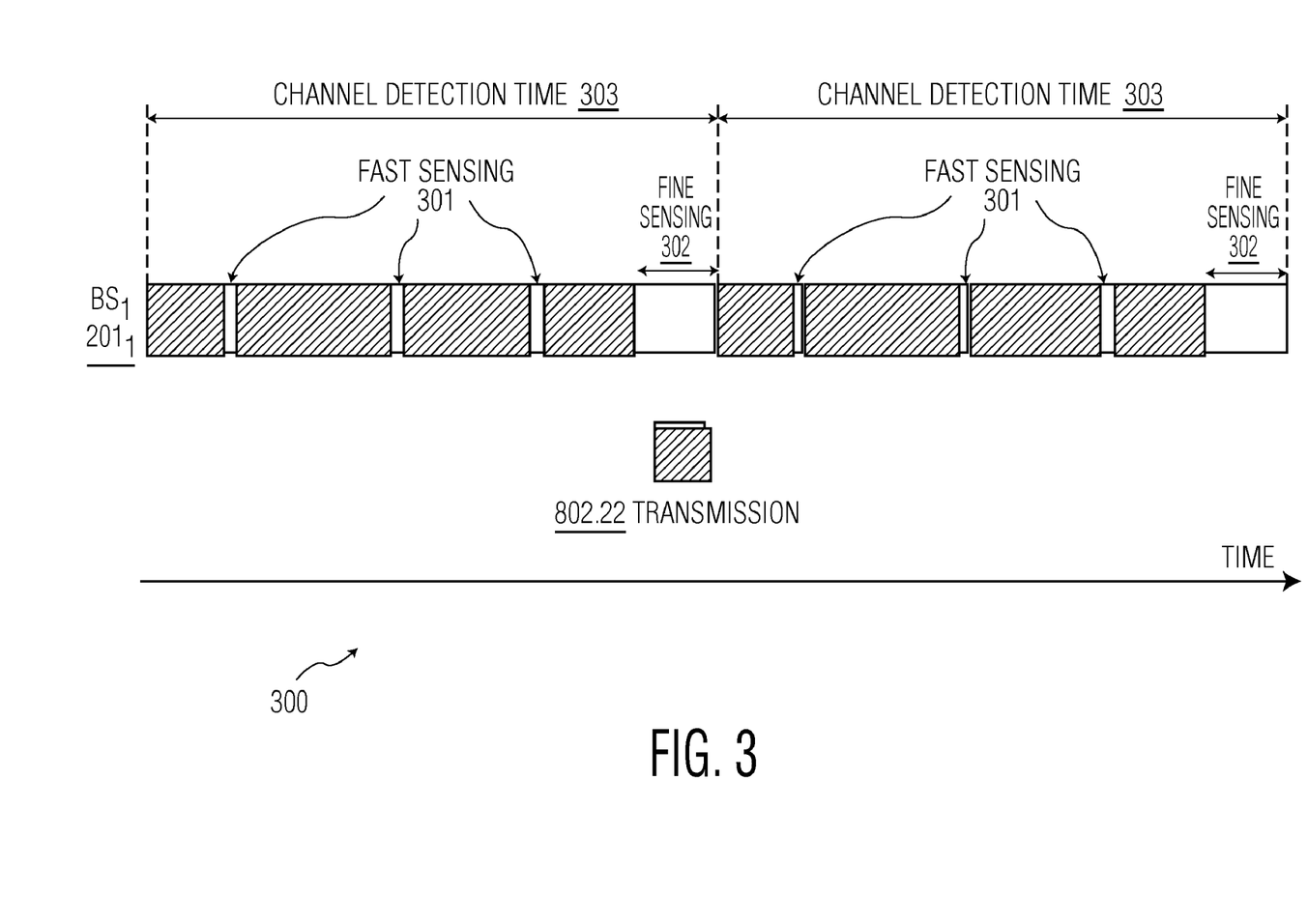
FIG. 3 illustrates a structure of a two-stage mechanism for quiet period management, according to the present invention.

The present invention is a system, apparatus and method for quiet period management as depicted for a BS 201 in FIG. 3. It comprises two stages both realized through the use of network-wide quiet periods, but which have very different time scales. They are:

Fast Sensing: The fast sensing stage comprises at least one fast sensing period 301 as depicted in FIG. 3, where each fast sensing period 301 is associated with a different frequency channel. During this stage, a fast sensing algorithm is employed (e.g., energy detection, pilot detection, cyclostationary detection). Typically, this is done in a very short time (e.g., 20 μsec in IEEE 802.11b and 9 μsec in IEEE 802.11a) and is highly efficient. The outcomes of the measurements done by all CPEs $202_i$ and the BS $201_1$ during this stage are consolidated and stored in a memory 1101 (see FIG. 11A) in the BS $201_1$ which then decides on the need for a subsequent fine sensing 302. [0]The measurements made by the CPEs $202_i$ have to be first reported to the BS $201_1$ before they can be stored in the BS' $201_1$ memory. So, the measurements from a CPE $202_i$ would be first stored in a CPE's $202_i$ memory, transmitted to the BS $201_1$, and then stored and consolidated at the BS $201_1$.

For example, if, during the fast sensing stage it is concluded that, e.g., energy in the affected channel is always below a pre-determined threshold, the BS 201 can decide to cancel the next scheduled fine sensing 302 period. Further, since each of the many fast sensing periods 301 can be associated with different frequency channels (e.g., with total of 3 fast sensing periods, one could be done on channel N, another on N−1, and another on N+1), it is possible that energy is detected in some channels but not in others. In this case, the BS 201 may decide to change the length of time of the next scheduled fine sensing period 302 to match what really needs more careful measurement. No more, no less. In an alternative embodiment, the BS $201_1$ schedules multiple fast sensing periods on the same channel in order to increase reliability (e.g., with a total of 6 fast sensing periods, 2 could be done on channel N, another 2 on channel N+1 and another 2 on channel N−1).

Fine Sensing: During the fine sensing stage 302, more detailed sensing is performed on the target channels. Typically, algorithms executed during the fine sensing stage 302 occupy longer time scales (e.g., on the order of 24 ms in the case of field-sync detection for ATSC, possibly a few milliseconds for matched filter and feature detection) for each single frequency channel, since at least one of particular signatures and characteristics are sought, i.e., of the primary user's transmitted signal. In other words, the fine sensing is typically several orders of magnitude larger than the fast sensing, which may be unacceptable to QoS sensitive traffic such as voice and video. Therefore, in order to meet the stringent QoS requirements of secondary users while protecting primary users, the presence as well as length of the fine sensing stage 302 has to be dynamically determined In a preferred embodiment, this is done through the feedback obtained during a fast sensing stage.

It is important to note (see FIG. 3) that the two-stage mechanism of the present invention repeats itself after the start of every Channel Detection Time (CDT) 303, which is a parameter defined by at least one of primary users (e.g., TV broadcasters), regulatory bodies (e.g., FCC in the Unites States), and industry (e.g., the IEEE). In addition, contrary to the fast sensing stage, the fine sensing stage 302 takes place at most once during the CDT 303, given that it takes a considerably longer time.

Figure 4A:
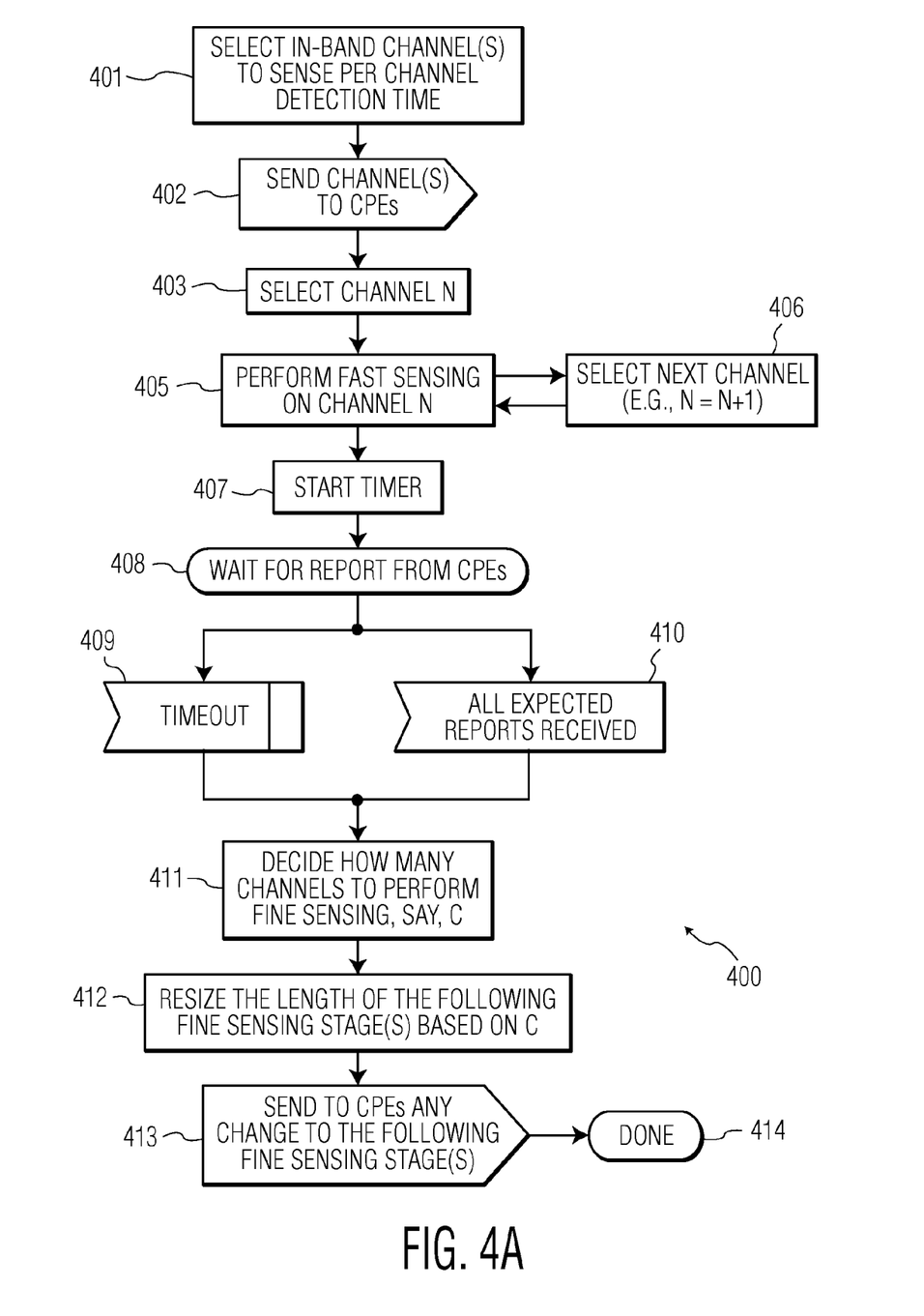
FIG. 4A illustrates a two-stage sensing procedure at the BS, according to the present invention.

FIGS. 4A and B illustrate a preferred embodiment of the method of the two-stage mechanism respectively at a BS 1201 and at CPEs $1202_i$ of an infrastructure network (illustrated in FIG. 12) modified with a respective BS 1100 and CPE 1150 apparatus (illustrated in FIGS. 11A-B) according to the present invention. At step 401 a BS 1201 selects the in-band channel(s) to sense per CDT 303 and at step 402 transmits the selections to CPEs $1202_i$ (in a preferred embodiment this is one of a "full dump" of all channels sensed and a progressive transmission of channels). Then, at step 403, the BS 1201 selects a channel N on which to perform fast sensing at step 405. The BS 1201 performs the fast sensing at step 405 for each of the selected in-band channels at step 406. The BS 1201 then starts a timer at 407 and waits, at step 408 for reports of fast sensing done by CPEs $1202_i$. The BS 1201 either times-out at step 409 or received all expected fast sensing reports from CPEs $1202_i$ at step 410. Then the BS 1201 decides on how many of channels to perform fine sensing, say C at step 411, resizes the length of the scheduled subsequent fine sensing stage based on C at step 412 and records any change in its local memory (see FIG. 11A, component 1101), and then communicates any changes to the CPEs $1202_i$ at step 413.

Figure 4B:
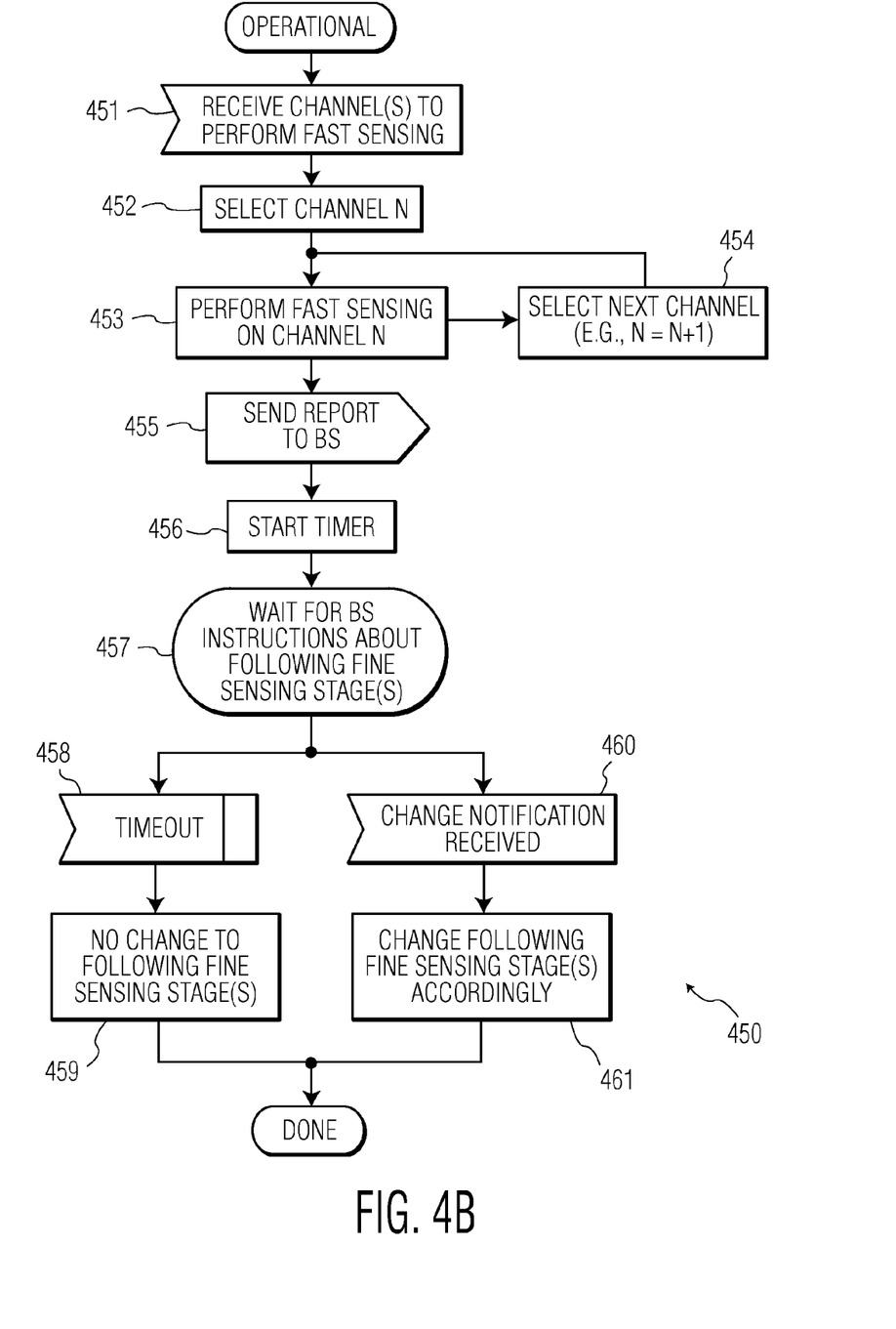
FIG. 4B illustrates a two-stage sensing procedure at the CPE, according to the present invention.
Figure 11B:
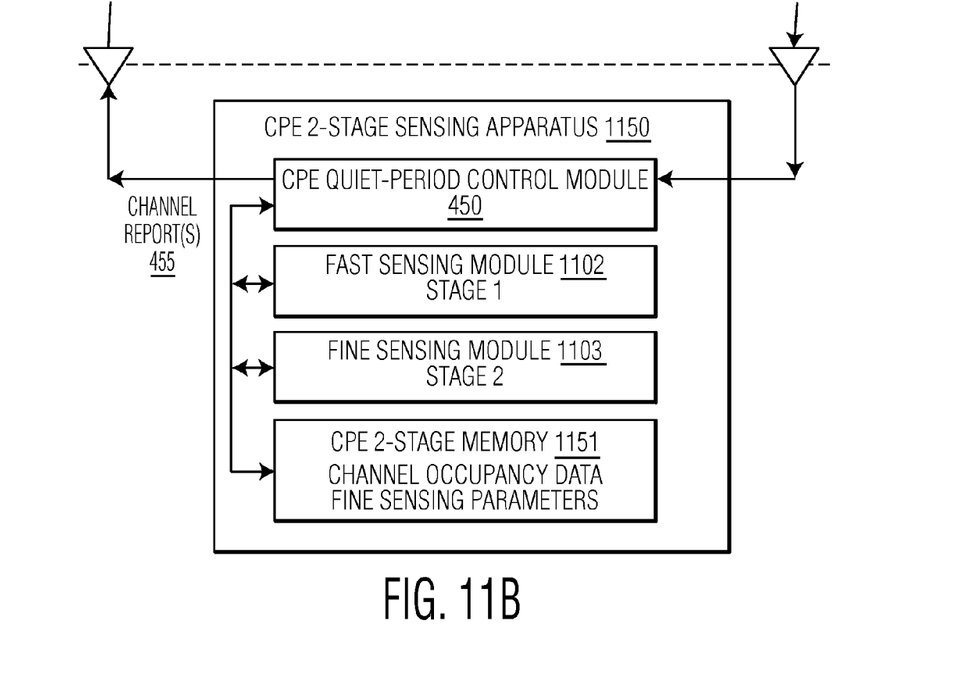
FIG. 11B illustrates a CPE apparatus for a two-stage sensing procedure, according to the present invention.
Figure 12:
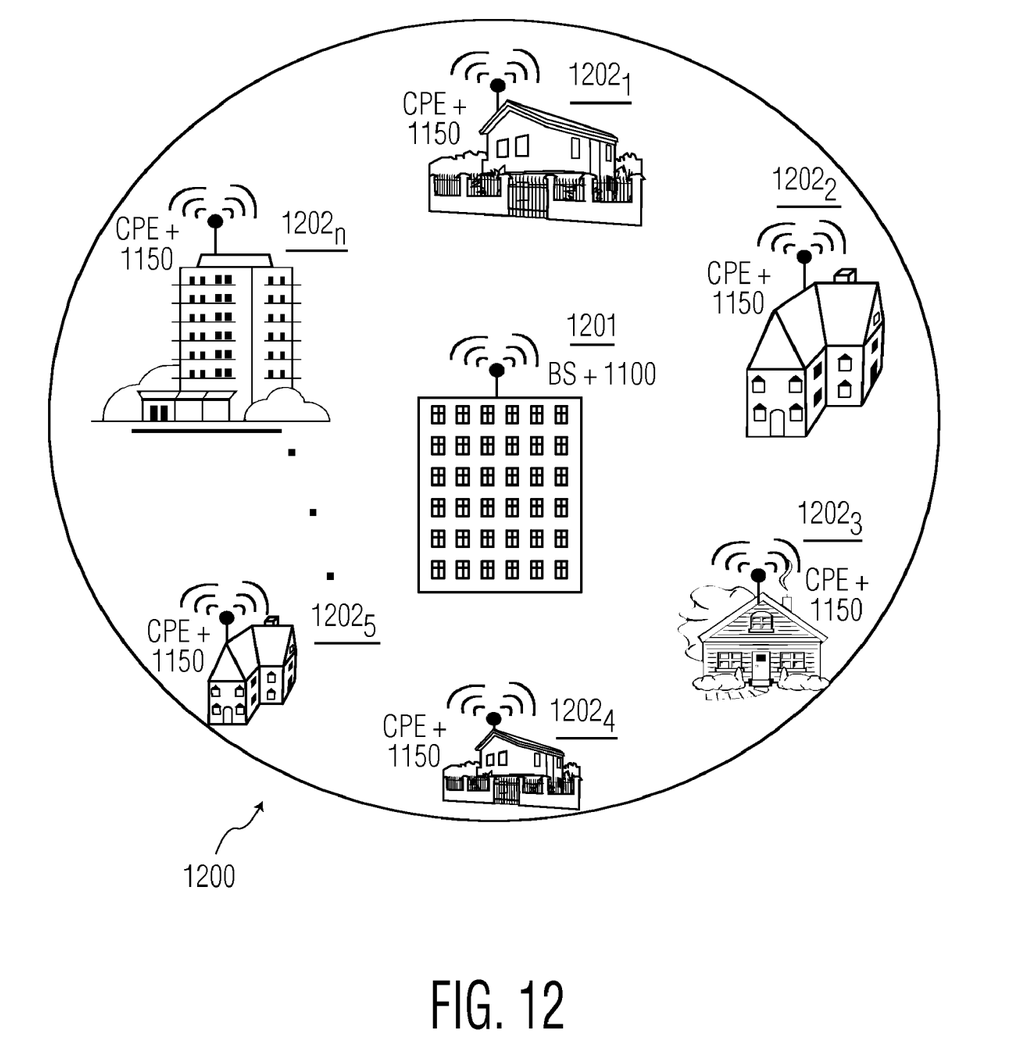
FIG. 12 illustrates an example of a centrally controlled wireless network comprised of one BS and a plurality of CPE each modified with a two-stage sensing apparatus, according to the present invention.

Referring now to FIG. 4B and FIG. 12, at step 411 a CPE $1202_i$ receives the N in-band channel(s) to sense per CDT 303 (in a preferred embodiment the list of channels is received at one of at once or progressively) and at step 452 selects channel N. Then, at step 453, the CPE $1202s_i$ performs fast sensing on channel N. The CPE $1202_i$ performs the fast sensing at step 453 for each of the selected in-band channels at step 454. At step 455, the CPE $1202_i$ reports back to the BS 1201 the results of its fast sensing measurements which are stored in its local memory (see FIG. 11B, component 1151). The CPE $1202_i$ then starts a timer at step 456 and waits, at step 457 for instructions from the BS 1201 about the following fine sensing stage. The instructions received apply to all subsequent fine sensing stages until new instructions are received from the BS 201. The CPE $1202_i$ either times-out at step 458 or receives change notification at step 460. Then, at steps 459 and 461 the CPE $1202_i$ records any fine sensing change notification in its local memory (see FIG. 11B, component 1151).

It should be noted that the fine sensing 302 is accomplished by the BS 1201 and CPEs $1202_i$ in accordance with these changes at the immediately following time for fine sensing, even though this is not shown in FIGS. 4A and B, it is shown in timing FIG. 3 for the BS 1201, which figure is meant to apply to every BS modified according to the present invention. Timing figure FIG. 3 applies as well to CPEs $1202_i$ insofar as the performance of the two-stage mechanism of the present invention is concerned.

As can be seen, the two-stage mechanism of the present invention provides numerous advantages since it distributes the sensing overhead. It provides proper protection to primary users since the fast sensing stage is able to detect the presence of any signal (obviously, above a given threshold such as the noise floor of the measuring device) in the measured channel within the required CDT 303. At the same time, it also enables the support of better QoS to secondary users, since the time consuming task of fine sensing is only performed when it is really needed.

There is one more issue that needs to be addressed, namely, when multiple overlapping secondary networks operate in the same frequency channel. Clearly, in this case if the fast sensing stage is implemented through energy detection, a secondary network may likely detect the energy of another secondary network and not of the intended primary user. This will disrupt this two-stage approach as the fine sensing stage would always take place.

Figure 5:
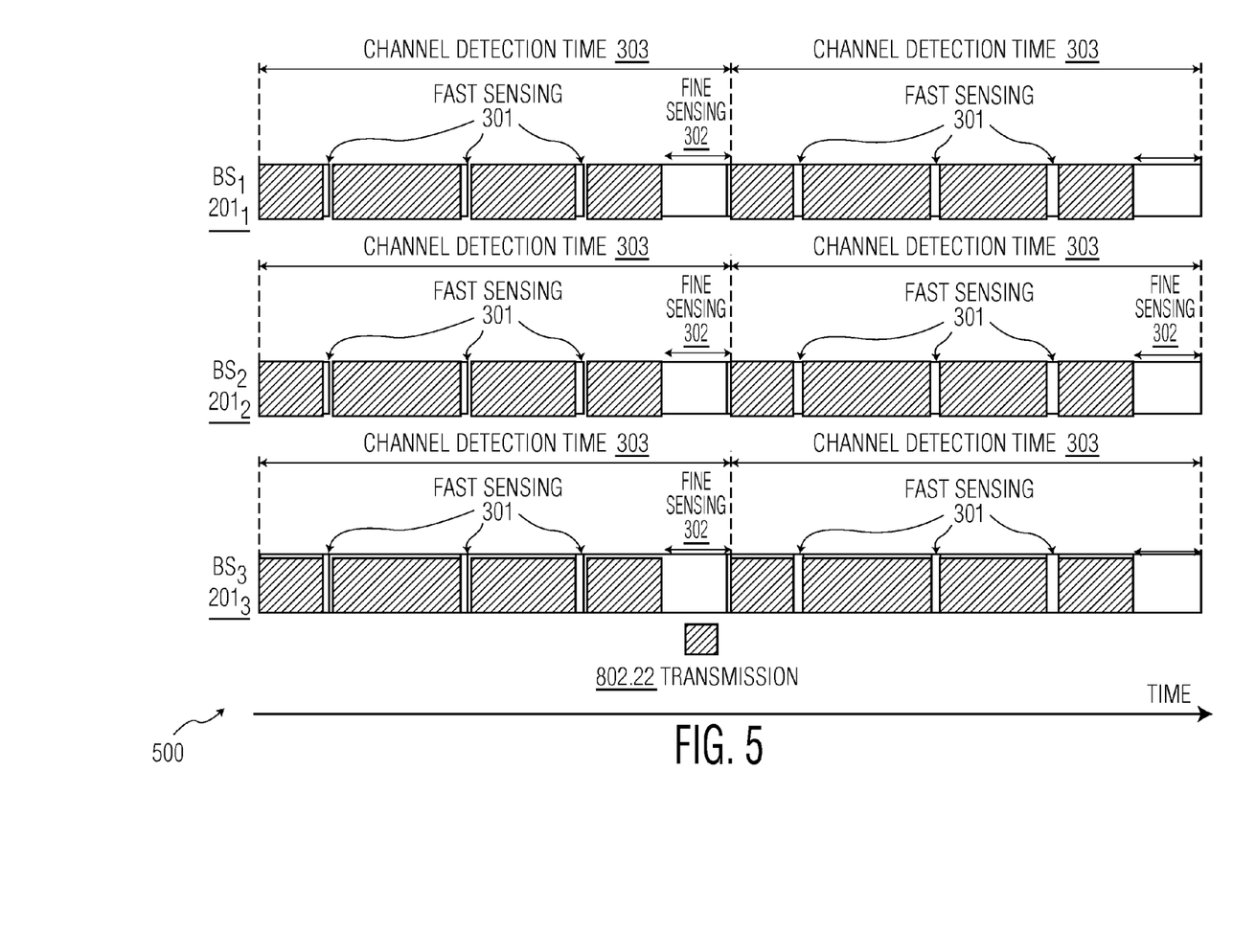
FIG. 5 illustrates a quiet period mechanism with multiple overlapping cells in a single channel.

To overcome this problem, it is assumed that overlapping networks are synchronized, as depicted in FIG. 5. By making this assumption, overlapping cells synchronize not only their frames but also their quiet periods. This ensures that the result of the fast sensing is highly efficient, since all secondary networks will quiet the channel at the same time and only the signal from the primary user remains in that channel.

Figure 11A:
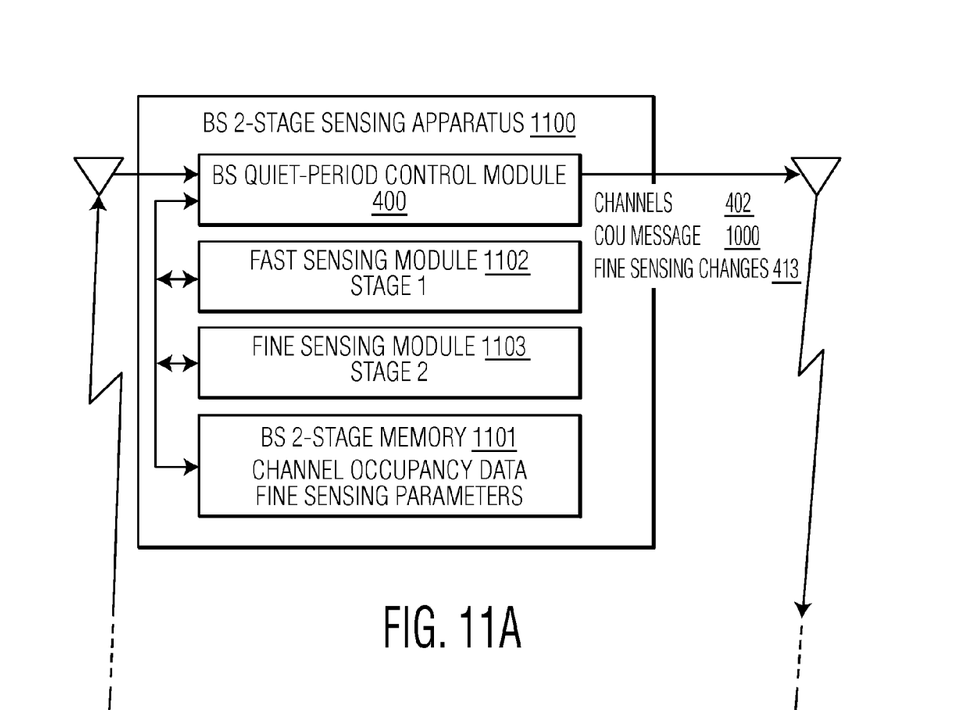
FIG. 11A illustrates a BS apparatus for two-stage sensing procedure, according to the present invention.

Fast Sensing Allocation 1102: One of the critical aspects of the present invention is that the fast sensing be carried out during a period of time that is common across overlapping networks. This ensures that all networks perform fast sensing at the same time, and so increases the effectiveness of fast sensing in detecting the primary user.

Figure 6:
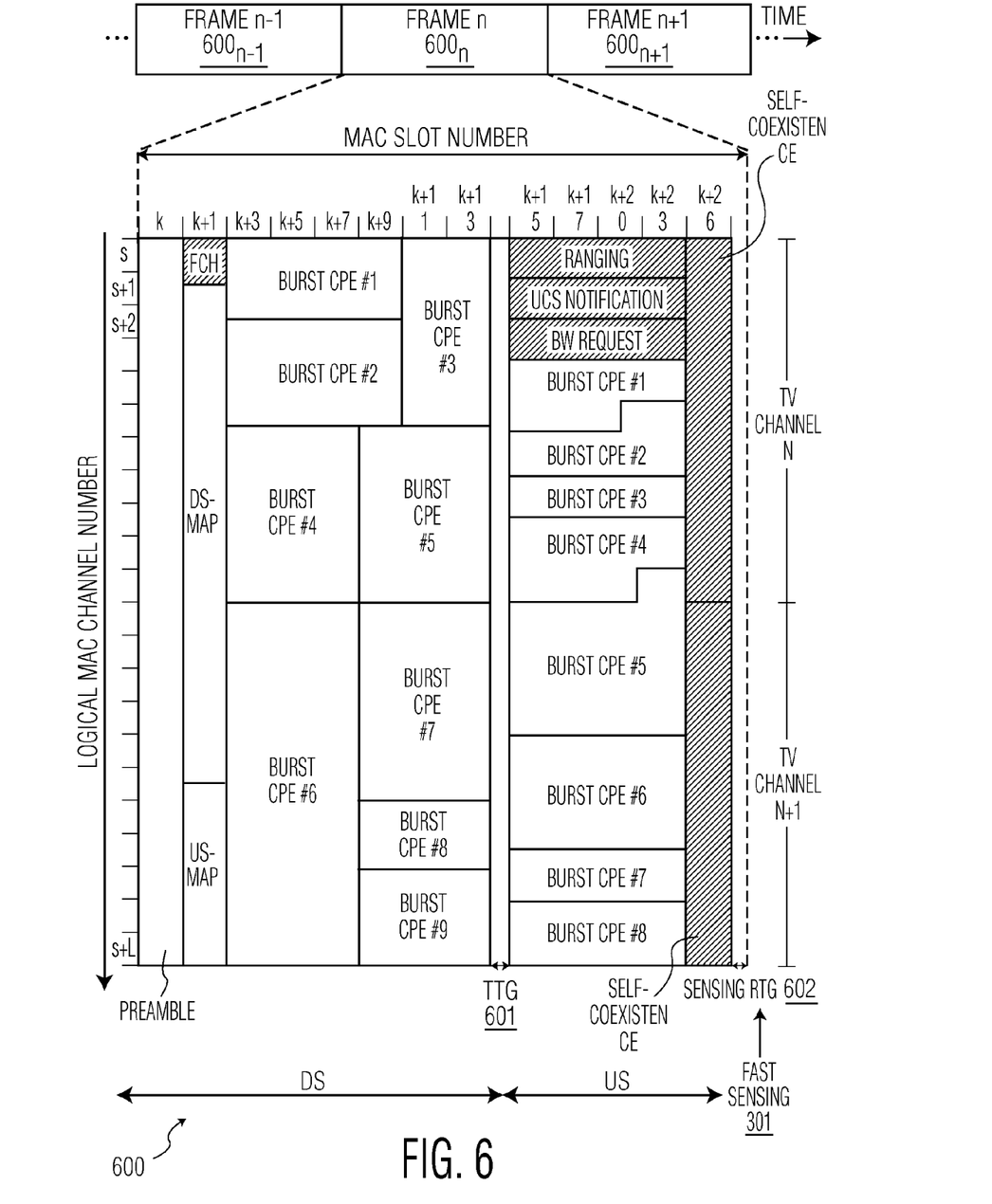
FIG. 6 illustrates a frame structure having a fast sensing period.

Assuming a TDMA-based MAC protocol (e.g., IEEE 802.16), in a preferred embodiment, the fast sensing is done at the end of a MAC frame as depicted in FIG. 6. Since frames of overlapping networks are synchronized, so are the ends of frames from different networks. Therefore, this guarantees that during this time fast sensing can be performed. This is not the case, for example, if such sensing is performed during the TTG (Transmit/Receive Transition Gap) window 601 as illustrated in FIG. 6, as overlapping networks have different ratios between upstream and downstream traffic. In an alternative embodiment, fast sensing allocation is fixed and pre-determined, so that it always occupies the same portion of the MAC superframe or frame structure.

In existing TDMA-based MAC protocols based on TDD (time division duplex), at the end of the frame a RTG (Receive/Transmit Transition Gap) 602 is always included. A preferred embodiment of the present invention dynamically controls the duration of this period of time (e.g., about 50 μsec in the case of IEEE 802.16) to perform the fine sensing. So, in a preferred embodiment, the BS 1201 dynamically configures the size of the RTG 602 depending upon whether or not fast sensing is to be carried. This is illustrated in FIG. 6, where at the end of a frame there is the Sensing RTG slot 602.

Figure 7:
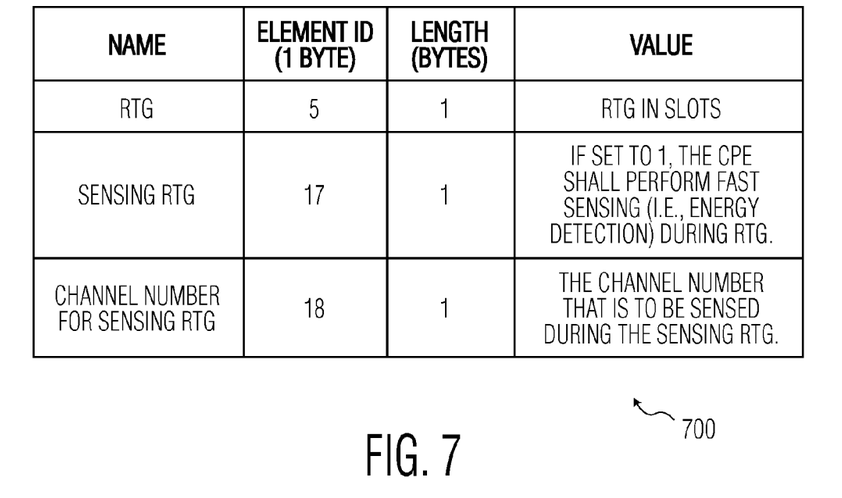
FIG. 7 illustrates parameters specified by the BS to enable fast sensing.

In a preferred embodiment, the BS 1201 informs CPEs 1202$_i$ in which frame fast sensing is to be performed. Additionally, the BS 1201 also specifies in which channel to perform fast sensing and the size of the Sensing RTG window 602. For example, considering a scheduled MAC, this can be specified together with one of the control messages. For IEEE 802.16, this can be done in one of the DCD and UCD message. FIG. 7 illustrates an example of which fields need to be specified by the BS 1202 for a fast sensing allocation.

CPE Report 455: In a preferred embodiment, once fast sensing stage is done, a CPE 1202$_i$ reports the measurement results back to the BS 1201. This is done either after each fast sensing period 301 or just once after all fast sensing periods which take place within the CDT 303. Regardless, the method a CPE 1202$_i$ uses to report such measurement results is critical to efficient use of bandwidth.

Figure 8:
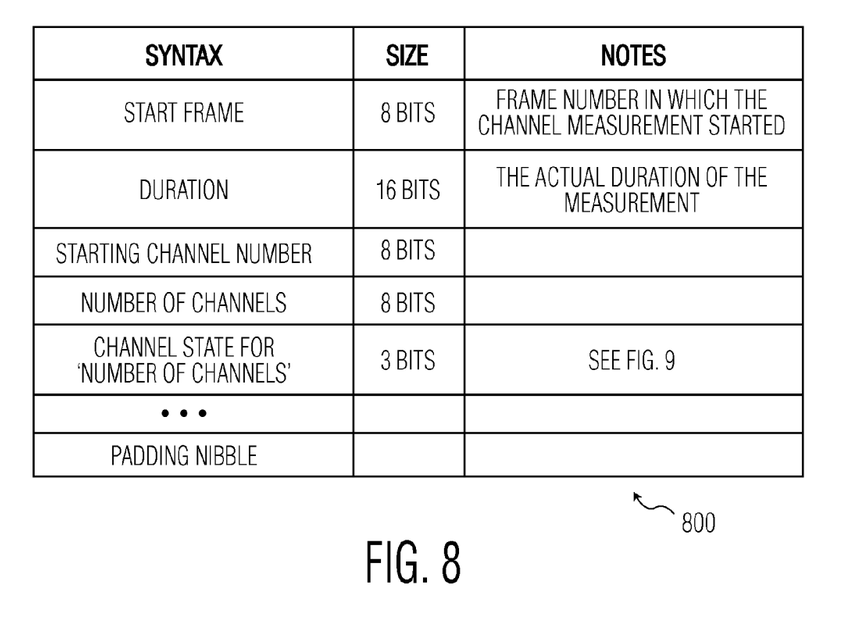
FIG. 8 illustrates a Consolidated Spectrum Occupancy Measurement Report.
Figure 9:
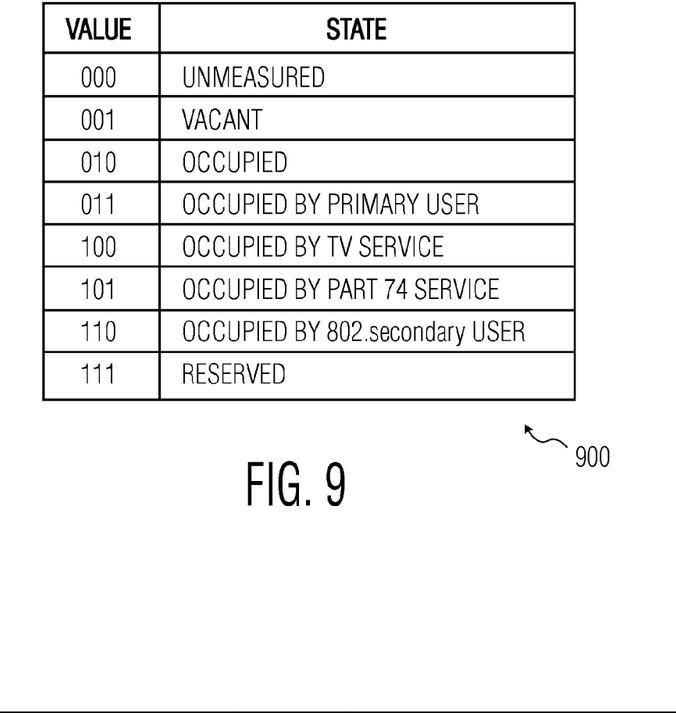
FIG. 9 illustrates a Channel state table.

The present invention provides a bandwidth efficient and abbreviated way of sending such reports. This is motivated by the fact that the outcome of the fast sensing (e.g., energy detection) measurements will likely be a simple YES/NO answer, and so does not require a detailed measurement report scheme. Here, a preferred embodiment employs a Consolidated Spectrum Occupancy Measurement Report 800 which is illustrated in FIG. 8. With this report, the CPE 1202$_i$ sends to the BS 1201, in a single message, the results of all of its fast sensing measurements done per CDT 303 period, which results in an extremely bandwidth-efficient scheme. Note that, in an alternative preferred embodiment, more detailed measurement reports are used.

Figure 10:
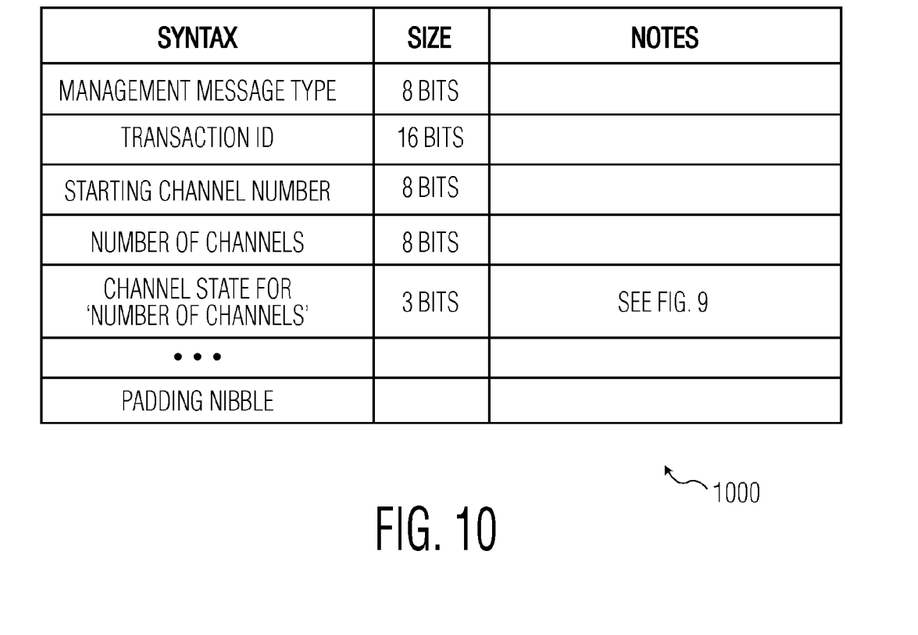
FIG. 10 illustrates a format for a Channel Occupancy Update message.

Fine Sensing Allocation 1103: Once the BS 1201 receives the reports from enough CPEs 1202$_i$ about their fast sensing measurements, the BS 1201 can make a decision with regard to a subsequent fine sensing stage(s). This is done through channel management messages and measurement requests that adaptively control the quiet periods. In a preferred embodiment, these are augmented by adding a Channel Occupancy Update (COU) message 1000 that is sent from the BS 1201 to the CPEs 1202$_i$. An example of a format of this COU message 1000 is illustrated in FIG. 10 and its intent is to inform CPEs about the consolidated channel occupancy information in the overall network. Typically, this is transmitted by the BS 1201 once it has received sufficient measurement reports from its associated CPEs 1202$_i$ to allow the BS 1201 to make a reliable decision on overall channel occupancy throughout the cell. This allows several features to be implemented including better channel management, optimization of CPEs 1202$_i$ measurement activities, and improved recovery procedures in case of in-band detection of incumbents.

Referring now to FIGS. 11A-B, which respectively illustrate a preferred embodiment of a BS 1100 and CPE 1150 2-stage sensing apparatus, each said apparatus includes a quiet-period control module 400 and 450 that perform the respective method of FIGS. 4A-B, as discussed above. Each of these apparatus' further includes a fast sensing module 1102 as stage 1 of the present invention and a fine sensing module 1103 as optional stage 2 of the present invention. Stages 1 and 2 are operably connected to and controlled by the respective quiet-period control module 400 450. Further, each apparatus 1100 1150 includes a memory for long term retention of channel occupancy data and fine sensing parameters as well as other short/long term required operating data by the respective BS 1100 and CPE 1150 apparatus. The BS 2-stage sensing apparatus 1100 is configured to receive channel reports 455 sent by CPEs 1202$_i$ and to send to CPEs 1202$_i$ at least the following information: channels 402, COU messages 1000 and fine sensing changes 413. Similarly, the CPE 2-stage sensing apparatus 1150 is configured to receive information sent by the BS 1201 that includes at least channels 402, COU messages 1000 and fine sensing changes. The CPE 2-stage sensing apparatus 1150 is further configured to send channel reports 455 derived from both fast and fine sensing performed by a CPE 1202$_i$ to the BS 1201.

FIG. 12 illustrates a centrally controlled wireless network comprised of one BS and a plurality of CPEs modified respectively with the BS apparatus 1100 and the CPE apparatus 1150 to perform the 2-stage sensing of the present invention.

The present invention is a basis for future IEEE 802.22, IEEE 802.11, and IEEE 802.15 wireless systems based on cognitive radios, but are not restricted to those.

While, several embodiments of the present invention have been illustrated and described, one skilled in the art will understand that changes may be made in these embodiments without departing from the principles and spirit of the present invention, the scope of which is defined in the appended claims and their equivalents. For example, more detailed measurement reports can be used.

We claim:

1. A quiet period management system, comprising:
    a 2-stage base station (BS) sensing apparatus to manage and perform a 2-stage network-wide quiet period occupancy sensing with respect to a list of channels; and
    at least one 2-stage customer premise equipment (CPE) sensing apparatus to perform and report on said 2-stage quiet period occupancy sensing with respect to the list of channels,
    wherein said 2-stage quiet period occupancy sensing includes a fast sensing to obtain channel occupancy data and a fine sensing controlled at least in part based on a result of the fast sensing.

2. The system of claim 1, wherein the BS apparatus further comprises:
    a BS fast sensing module as a stage 1;
    a BS fine sensing module as a stage 2; and
    a BS quiet-period control module that is configured to execute the BS fast sensing module to obtain channel occupancy data, determine therefrom the N≧1 channels of the list of channels, and communicate the list to the at least one CPE sensing apparatus.

3. The system of claim 2, wherein the CPE apparatus further comprises:
    a CPE fast sensing module as a stage 1;
    a CPE fine sensing module as a stage 2; and
    a CPE quiet-period control module that is configured to execute the CPE fast sensing module and the CPE fine sensing module to obtain and report channel occupancy data for the list of channels based on received fine sensing changes.

4. The system of claim 3, wherein the BS quiet-period control module is further configured to receive the reports from the at least one CPE apparatus, consolidate the received reports in a channel occupancy update message, determine therefrom the following performance of and fine sensing changes to fine sensing parameters for the BS fine sensing module and the at least one CPE fine sensing module, and send a consolidated occupancy utilization message and fine sensing changes to the at least one CPE.

5. The system of claim 4, wherein:
the BS apparatus is further comprises a BS 2-stage memory;
the BS control module is operably connected to the BS 2-stage memory and further configured to store therein—
channel occupancy data,
fine sensing parameters; and
the CPE apparatus further comprises a CPE 2-stage memory;
the CPE control module is operably connected to the CPE 2-stage memory and further configured to store therein—
channel occupancy data, and
fine sensing parameters;
wherein, the channel occupancy data determines usage of the channel by the at least one CPE apparatus, the fine sensing parameters, and performance of the fine sensing module by both the BS apparatus and the at least one CPE apparatus.

6. The system of claim 5, wherein each fast sensing module is performed in at least one fast sensing period such that each said at least one fast sensing period is associated with one frequency selected from the group consisting of a same frequency channel and a different frequency channel and the outcomes of all fast sensing performed by the BS fast sensing module and the at least one CPE fast sensing module are consolidated and respectively stored in the BS memory and the CPE memory.

7. The system of claim 6, wherein each fast sensing module performs a fast sensing algorithm selected from the group consisting of energy detection, pilot detection, and cyclostationary detection.

8. The system of claim 7, wherein:
the BS control module is further configured to determine from the channel occupancy data and the reports of the at least one CPE 2-stage sensing apparatus that energy in a given channel of the list of channels is always below a pre-determined threshold and then cancel a next scheduled fine sensing period for the BS apparatus and the at least one CPE sensing apparatus, adjust the fine sensing parameters in the BS memory, and send fine sensing changes to the at least one CPE apparatus; and
the at least one CPE control module is further configured to receive and apply fine sensing changes to the fine sensing parameters stored in the CPE memory of the at least one CPE apparatus and cancel the next scheduled fine sensing period based on the received fine sensing changes.

9. The system of claim 8, wherein each of the BS sensing apparatus and the at least one CPE sensing apparatus is respectively further configured to execute the BS quiet-period control module and the CPE quiet-period control module after the start of every channel detection time (CDT) such that, during the CDT, the fast sensing stage takes place at least once and the fines sensing stage takes place at most once.

10. The system of claim 9, wherein any overlapping networks are synchronized such that quiet period thereof are synchronized.

11. The system of claim 10, wherein the BS quiet-period control module is further configured to determine a size of a sensing Receive/Transmit Transition Gap (RTG) window and a frame in which fast sensing is performed by both the BS quiet-period control module and the CPE quiet-period control module.

12. The system of claim 11, wherein the at least one CPE 2-stage sensing apparatus outputs channel reports after one of the events selected from the group consisting of an individual fast sensing period and all fast sensing periods which tack place within the CDT.

13. The system of claim 12, wherein the at least one CPE 2-stage sensing apparatus is further configured to provide a consolidated spectrum occupancy measurement report that includes results all fast sensing performed by the fast sensing module of the CPE sensing apparatus per CDT.

14. A 2-stage base station (BS) sensing apparatus to manage and perform a 2-stage network-wide quiet period occupancy sensing with respect to a list of channels, comprising:
a BS fast sensing module as a stage 1 of said 2-stage network-wide quiet period occupancy sensing;
a BS fine sensing module as a stage 2 of said 2-stage network-wide quiet period occupancy sensing; and
a BS quiet-period control module that is configured to execute the BS fast sensing module to obtain channel occupancy data, determine therefrom $N \geq 1$ channels of the list of channels, and communicate the list to at least one CPE to request channel occupancy reports therefrom for each channel in the list.

15. The BS sensing apparatus of claim 14, wherein the BS quiet-period control module is further configured to receive the reports from the at least one CPE consolidate the received reports in a channel occupancy update message, determine therefrom the following performance of and fine sensing changes to fine sensing parameters for the BS fine sensing module and the at least one CPE, and send the channel occupancy update message and fine sensing changes to the at least one CPE 2-stage sensing apparatus.

16. The BS sensing apparatus of claim 15, wherein:
the BS apparatus further comprises a BS 2-stage memory;
the BS control module is operably connected to the BS 2-stage memory and further configured to store therein—
channel occupancy data,
fine sensing parameters;
wherein, the channel occupancy data determines usage of the channel by the at least one CPE, the fine sensing parameters, and performance of the fine sensing module by both the BS apparatus and the at least one CPE.

17. The BS sensing apparatus of claim 16, wherein the fast sensing module is performed in at least one fast sensing period such that each said at least one fast sensing period is associated with at least one frequency selected from the group consisting of a same frequency channel and a different frequency channel and the outcomes of all fast sensing performed by the BS fast sensing module are consolidated and stored in the BS 2-stage memory.

18. The BS sensing apparatus of claim 17, wherein the fast sensing module performs a fast sensing algorithm selected from the group consisting of simple energy detection, pilot detection, and cyclostationary detection.

19. The BS sensing apparatus of claim 18, wherein:
the BS control module is further configured to determine from the channel occupancy data and the reports received from the at least one CPE that energy in a given channel of the list of channels is always below a pre-determined threshold and then cancel a next scheduled fine sensing period for the BS apparatus and the at least one CPE, adjust the fine sensing parameters in the BS memory and send fine sensing changes to the at least one CPE.

20. The BS sensing apparatus of claim 19, wherein the BS 2-stage sensing apparatus is further configured to execute the BS quiet-period control module after the start of every channel detection time (CDT) such that, during the CDT, the fast sensing stage takes place at least once and the fine sensing stage takes place at most once.

21. The BS sensing apparatus of claim 20, wherein any overlapping networks are synchronized such that quiet periods thereof are synchronized.

22. The BS sensing apparatus of claim 21, wherein the BS quiet-period control module is further configured to determine a size of a sensing Receive/Transmit Transition Gap (RTG) window and a frame in which fast sensing is performed by both the BS quiet-period control module and the at least one CPE 2-stage sensing apparatus.

23. A 2-stage customer premise equipment (CPE) sensing apparatus to perform and report on quiet period occupancy sensing with respect to a list of channels, comprising:
a CPE fast sensing module as a stage 1 of a 2-stage quiet period occupancy sensing;
a CPE fine sensing module as a stage 2 of a 2-stage quiet period occupancy sensing; and
a CPE quiet-period control module that is configured to execute the CPE fast sensing module and the CPE fine sensing module to obtain and report channel occupancy data for the list of channels based on fine sensing changes received from a base station (BS).

24. The CPE sensing apparatus of claim 23, further configured to send channel reports to a base station (BS), to receive from the BS a consolidated report in a channel occupancy update message and fine sensing changes to fine sensing parameters for and to determine therefrom performance of a following fine sensing module.

25. The CPE sensing apparatus of claim 24, wherein:
the CPE apparatus further comprises a CPE 2-stage memory;
the CPE control module is operably connected to the CPE 2-stage memory and further configured to store therein—
channel occupancy data, and
fine sensing parameters;
wherein, the channel occupancy data determines usage of the channel by the at least one CPE apparatus, the fine sensing parameters, and performance of the fine sensing module by both the BS and the CPE sensing apparatus.

26. The CPE sensing apparatus of claim 25, wherein the fast sensing module is performed in at least one fast sensing period such that each said at least one fast sensing period is associated a frequency selected from a same frequency channel and a different frequency channel and the outcomes of all fast sensing performed by the fast sensing module are consolidated and stored in the CPE memory.

27. The CPE sensing apparatus of claim 26, wherein each fast sensing module performs a fast sensing algorithm selected from the group consisting of energy detection, and pilot detection, and cyclostationary detection.

28. The CPE sensing apparatus of claim 27, further configured to receive from the BS and apply fine sensing changes to the fine sensing parameters stored in the CPE memory and cancel the next scheduled fine sensing period based on the received fine sensing changes.

29. The CPE sensing apparatus of claim 28, further configured to execute the CPE quiet-period control module after the start of every channel detection time (CDT) such that, during the CDT, the fast sensing stage takes place at least once and the fine sensing stage takes place at most once.

30. The CPE sensing apparatus of claim 29, wherein any overlapping networks are synchronized such that quiet periods thereof are synchronized.

31. The CPE sensing apparatus of claim 30, further configured to accept from the BS a size of a sensing Receive/Transmit Transition Gap (RTG) window and a frame in which fast sensing is performed.

32. The CPE sensing apparatus of claim 31, further configured to output channel reports after one of the events selected from the group consisting of an individual fast sensing period and all fast sensing periods which tack place within the CDT.

33. The CPE sensing apparatus of claim 32, further configured to provide a consolidated spectrum occupancy measurement report that includes results all fast sensing performed by the fast sensing module of the CPE sensing apparatus per CDT.

34. A method for determining network-wide quiet period occupancy, comprising the steps of:
determining a list of channels by a base station (BS); and
executing a fast sensing stage by the BS and at least one customer premise equipment (CPE) to produce reports thereby on quiet period occupancy for the list of channels;
consolidating by the BS, the BS and CPE reports as channel occupancy data;
determining, by the BS, from the channel occupancy data whether the energy in a given channel of the list of channels is always below a pre-determined threshold and performing the steps of:
a. cancelling a next scheduled fine sensing period for the given channel when the energy is determined to be always below a pre-determined threshold,
b. otherwise performing, by the BS and at least one CPE, a next scheduled fine sensing period for the given channel to obtain fine sensing data for the given channel, and
c. adjusting the channel occupancy data with the fine sensing data for the given channel; and
using a channel by the at least one CPE on the basis of the channel occupancy data for that channel.

35. The method of claim 34, wherein the step of executing the fast sensing stage takes place at least once and the fine sensing stage takes place at most once.

36. The method of claim 35, further comprising the step of synchronizing any overlapping networks such that quiet periods thereof are synchronized.

37. The method of claim 36, further comprising the steps of:
determining a size of a sensing Receive/Transmit Transition Gap (RTG) window and
determining a frame in which fast sensing is performed by both the BS and the at least one CPE.

38. The system of claim 37, further comprising the step of the at least one CPE outputting channel reports after one of the events selected from the group consisting of an individual fast sensing period and all fast sensing periods which take place within a CDT.

39. The method of claim 38, further comprising the step of the at least one CPE providing a consolidated spectrum occupancy measurement report that includes results of all fast sensing performed per CDT.

40. The method of claim 39, wherein the fast sensing stage is accomplished using an algorithm selected from the group consisting of energy detection, pilot detection, and cyclostationary detection.

41. The method of claim 40, wherein the fast sensing stage is performed in at least one fast sensing period such that each said at least one fast sensing period is associated with a different frequency.

* * * * *